UNITED STATES PATENT OFFICE.

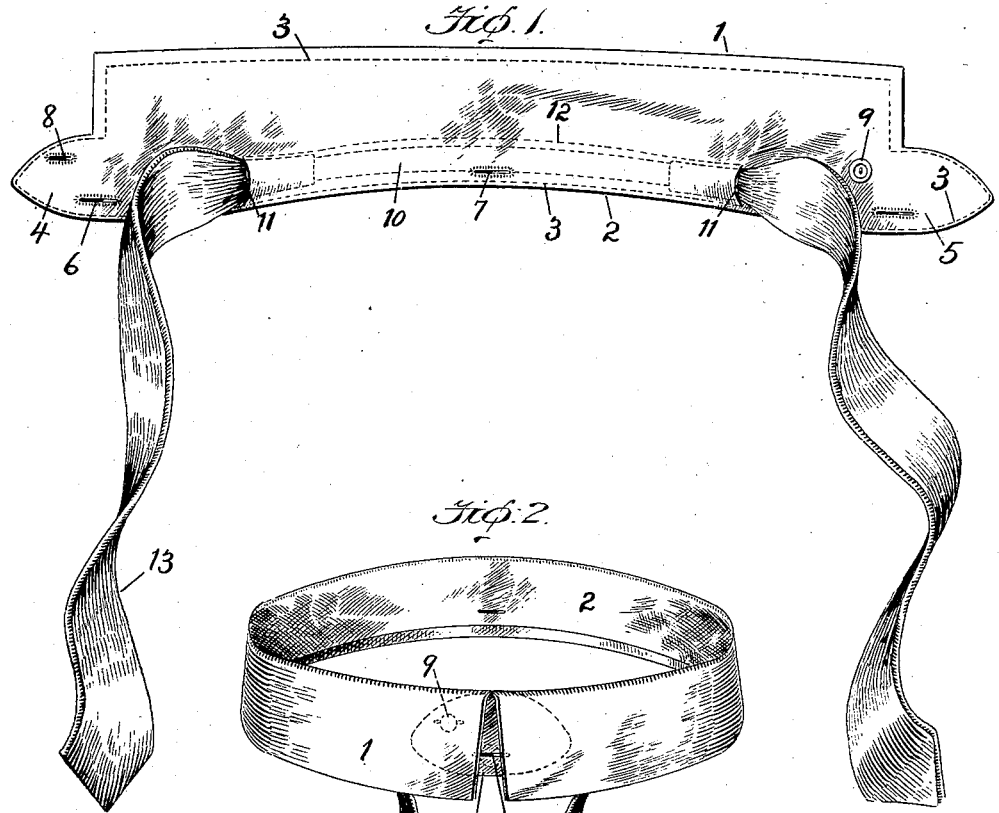

EDWARD A. CHRISTMAN, OF BALTIMORE, MARYLAND.

SHIRT-COLLAR.

No. 918,284.  Specification of Letters Patent.  Patented April 13, 1909.

Application filed August 10, 1908. Serial No. 447,714.

*To all whom it may concern:*

Be it known that I, EDWARD A. CHRISTMAN, a citizen of the United States, residing at Baltimore, in the State of Maryland, have invented certain new and useful Improvements in Shirt-Collars, of which the following is a specification.

This invention relates to an improved shirt collar.

The improved combined article is designed more particularly for soft or unstarched turn-over collars, and one of the objects of the invention is to provide a collar with a tubular construction that will admit the insertion therein of the neck-tie and permit the latter to have endwise movement after the collar has been attached to the neck-band of the shirt.

The accompanying drawing illustrates the invention.

Figure 1 shows the back of the collar spread open lengthwise and the necktie extending through the tubular passage formed in the collar. Fig. 2 shows the collar in the circle form in which it is worn, with the tab-ends overlapped, and neck-tie attached but the front ends of the latter disunited. Fig. 3 shows the neck-tie detached from the collar.

The improved collar admits of various forms of construction the particular construction shown is that which has the outer or turn-over part, 1, and the band-part, 2, both made of one piece of goods, but this is immaterial and said parts may be otherwise made.

The collar is made of two plies whose edges are folded inward and the plies are stitched together by stitches, 3. The collar has two tab-ends, 4, 5, each provided with the usual button-hole, 6, for attachment to the neck-band of the shirt by a front collar-button, and a button-hole, 7, in the center at the back, is for attachment to the neck-band of the shirt. The two tab-ends, 4, 5, completely overlap when the collar is buttoned on and the outer lapped tab-end, 4, is long enough to tuck under the turn-over part, 1, as shown by broken lines in Fig. 2.

I provide one tab-end, 4, with an additional button-hole, 8, and the band-part, 2, near the other tab-end, 5, has on its outer surface a button, 9, that engages said additional button hole.

The view in Fig. 1 is the back of the collar; when folding the collar preparatory to putting it on, the outer or turn-over part, 1, will be folded down so as to cover the button, 9. When the collar is in position about the neck of the wearer the tab-end, 4, which has the button-hole, 8, will be the outer or over-lapping end. The additional button-hole, 8, and button, 9, serve the useful purpose of holding the outer or over-lapping tab-end, 4, to its tucked-under position, and prevent said tab-end from freeing itself and becoming displaced.

I form in the band-part, 2, of the collar a tubular passageway, 10, whose two ends terminate at the vertical slits, 11, which are cut through only the single ply constituting the outermost side of said neck-band part. This passageway extends lengthwise of the collar and is between the two plies or two thicknesses of material of which the collar is made, and is formed by two rows of stitches of which one row, 3, is near the bottom edge and is the same that holds the two plies together, and the other row, 12, is parallel therewith; the space inclosed between the two rows, 3, and, 12, constitute the said passageway, 10. At its two ends this passageway has openings, 11.

The neck-tie comprises two broad ends, 13, and a connecting middle section, 14,—this middle section is relatively much narrower than the two ends and in practice an ordinary narrow cotton tape would serve the purpose. The middle section, 14, of the neck-tie may preferably be a little shorter than the length of the passageway, 10, in the collar.

One end of the neck-tie is run through the passageway of the collar until the middle section, 14, fully occupies said passageway, and both ends, 13, of the neck-tie are left exposed. As the two ends of the neck-tie are relatively much broader than the middle tape, 14, that connects said two ends, the neck-tie will remain in its position after its narrow middle tape has been placed in the narrow passageway, 10. If desired both the collar and neck-tie while thus united may be laundered; as the collar will be unstarched there is no necessity to separate the two when they are laundered. While this is true the improved construction will permit of the neck-tie being separated from the collar when desired.

It will be seen that the two parts are so connected as to make it very convenient for a person to put them on and adjust them about the neck. After the collar has been attached to the neck-band of the shirt, the neck-tie may be adjusted by an endwise movement independently of the collar, and this is the result of the construction of the passageway, 10, in the collar, and the insertion in said passageway of the neck-tie and its freedom to move therein.

Having thus described my invention what I claim and desire to secure by Letters Patent is,—

1. A shirt collar comprising a plural number of plies of material having an outer turn-over part and an inner band part which latter is provided between its plies with a closed tubular passageway having open ends, whereby a neck-tie may be inserted through said tubular passageway and project out from the open ends thereof.

2. A shirt-collar comprising a neck-band and a turn-over part made of a plural number of plies, said neck-band part having the usual three button-holes,—one being at each end and one at the center and provided on its outermost side only with two vertical slits, 11, which are intermediate the said end-holes and center-hole, and said neck-band part also provided with a tubular passageway that is continuous between and terminates at the said two vertical slits.

3. A collar comprising a plural number of plies of material and having an outer turn-over part and an inner band part,—said band part having a passageway formed between its plies which passageway is closed along both longitudinal sides and is provided with end-openings which are covered by the outer turn-over part of the collar, whereby a neck-tie may extend freely through the longitudinally-closed passageway and have its ends project out of said end-openings.

In testimony whereof I affix my signature in presence of two witnesses.

EDWARD A. CHRISTMAN.

Witnesses:
   G. FERDINAND VOGT,
   CHARLES B. MANN, Jr.